United States Patent [19]

Kniazzeh et al.

[11] Patent Number: 4,532,193
[45] Date of Patent: Jul. 30, 1985

[54] VENTED FRAME FOR LAMINAR BATTERIES AND METHODS OF MAKING THE SAME

[75] Inventors: Alfredo G. Kniazzeh, West Newton; Dennis R. Mailloux, Westminster; Kestutis Norvaisa, Lexington, all of Mass.

[73] Assignee: Polaroid Corporation, Cambridge, Mass.

[21] Appl. No.: 852,921

[22] Filed: Nov. 18, 1977

[51] Int. Cl.³ ............................................. H01M 2/12
[52] U.S. Cl. ....................................... 429/82; 156/250; 156/253; 156/324; 429/86
[58] Field of Search ............... 156/250, 252, 253, 108, 156/302, 324, 554, 555, 514; 29/623.2, 623.3, 623.4, 623.5; 429/86, 126, 82

[56] References Cited

U.S. PATENT DOCUMENTS

| | | | |
|---|---|---|---|
| 1,983,323 | 12/1934 | Stokes | 156/514 |
| 2,273,554 | 2/1942 | Bannon | 156/554 |
| 2,511,303 | 6/1950 | Stevens | 156/554 |
| 2,632,784 | 3/1953 | Marsal | 136/133 |
| 2,870,235 | 1/1959 | Soltis | 136/111 |
| 3,081,371 | 3/1963 | Toda | 93/35 |
| 3,411,419 | 11/1968 | Becker | 136/177 |
| 3,647,557 | 3/1972 | Kegelman | 136/177 |
| 3,687,764 | 8/1972 | Rogosch | 156/179 |
| 3,741,812 | 6/1973 | Spellman | 136/107 |
| 3,769,137 | 10/1973 | Moriyama | 156/309 |
| 3,870,566 | 3/1975 | Bergum | 136/111 |
| 3,933,555 | 1/1976 | Downey | 156/251 |
| 4,028,479 | 6/1977 | Fanciullo | 429/152 |
| 4,105,831 | 8/1978 | Plasse | 429/86 |

Primary Examiner—Caleb Weston
Attorney, Agent, or Firm—Gaetano D. Maccarone

[57] ABSTRACT

A method of making vented battery frames in which strips of paper are laminated between strata of dissimilar thermoplastic materials, at least one of which is formed as a frame, having a central opening to receive battery components.

13 Claims, 9 Drawing Figures

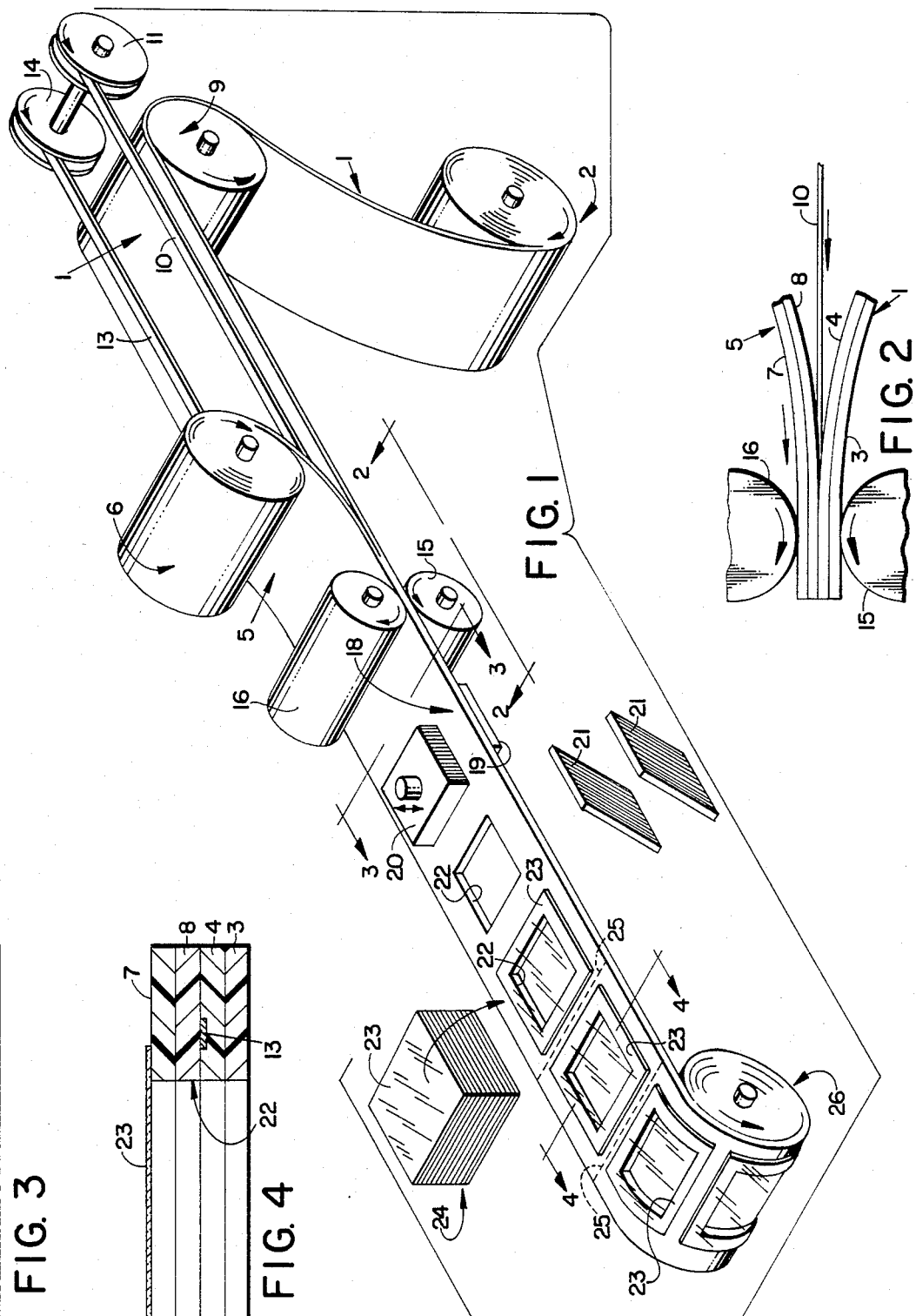

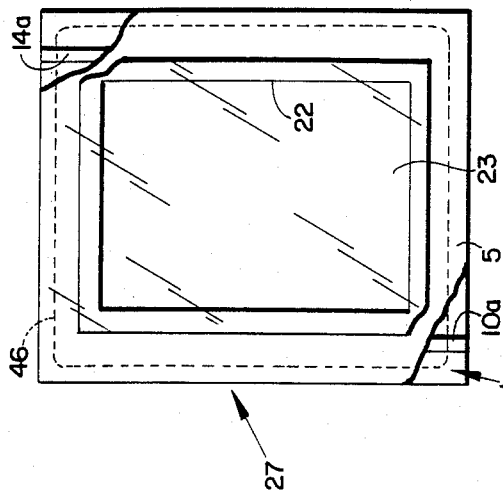
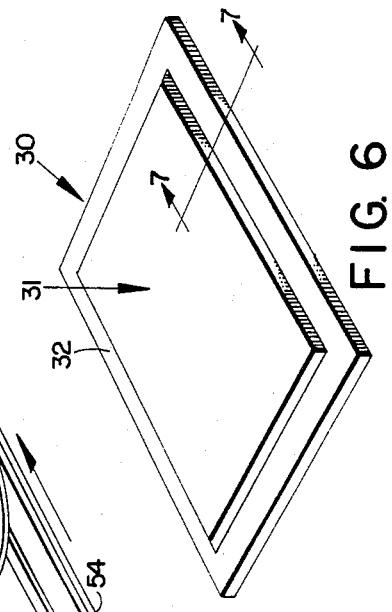
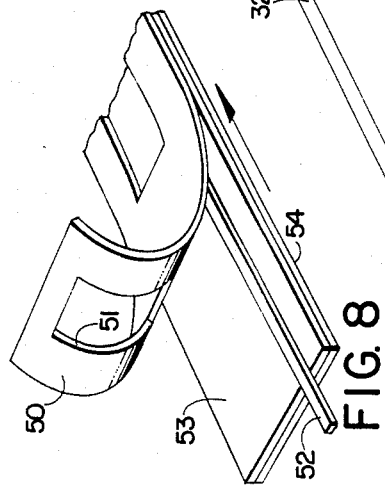
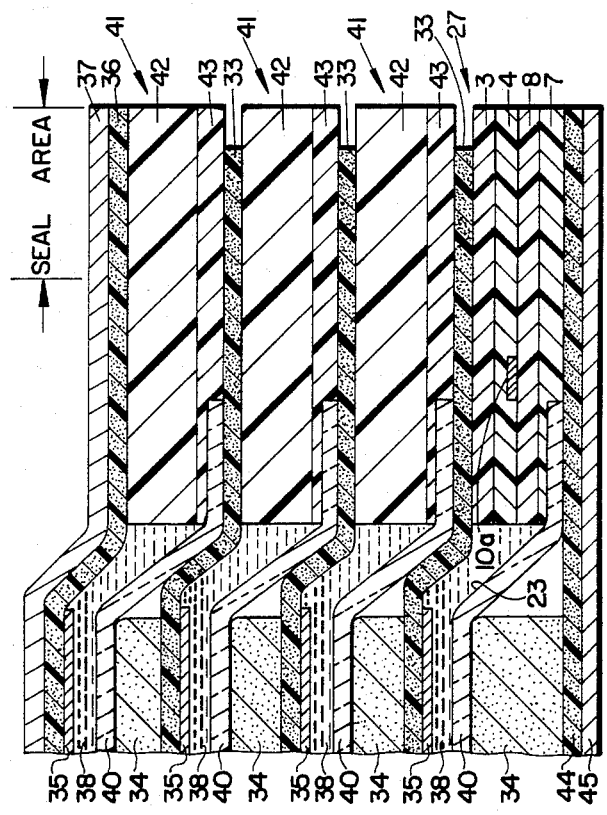
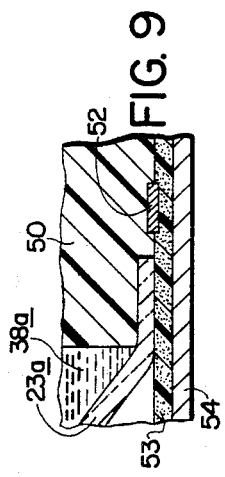

VENTED FRAME FOR LAMINAR BATTERIES AND METHODS OF MAKING THE SAME

This invention relates to electrical cells and batteries, and particularly to a novel vented battery frame structure and a method of making the same.

U.S. application Ser. No. 761,653 was filed on Jan. 24, 1977, abandoned, by Alfredo G. Kniazzeh for Method and Apparatus for Manufacturing Battery Vents and Vented Batteries, abandoned and replaced by continuation-in-part application Ser. No. 825,920, filed Nov. 18, 1977, now U.S. Pat. No. 4,254,191. In that application, a method of making vented batteries is disclosed in which narrow elongated strips of paper are encased in a thermoplastic tube by laminating paper between sheets of thermoplastic material, cutting the resulting laminate into strips, and then forming the strips into thermoplastic tubes enclosing the paper strips by application of heat and pressure. One or more of these tubes is then disposed in a thin flat battery in such a manner that at least one end passes through the battery seal and a major portion of the tube is exposed to gas and/or liquid permeable internal regions of the battery. In one embodiment described in application Ser. No. 761,653, abandoned, the tube vents just described are laminated between two sheets of thermoplastic material which are then cut into battery frames. The object of this invention is to simplify the manufacture of verted batteries incorporating paper strips as vents.

Briefly, the above and other objects of the invention are attained by a novel process in which narrow strips of paper are laminated between sheets of dissimilar thermoplastic materials, one of which preferably has a softening temperature range at substantially higher temperatures than the other. Lamination is carried out under conditions selected to cause the lower softening material to flow and encase the paper strips, without materially penetrating the interstices between the fibers of the paper, and at the same time being sealed and bonded to the paper and also to the higher softening strip. Strips of the laminate are subsequently cut for the manufacture of laminar batteries. By this process, there is formed a dual gas diffusion venting mechanism for the battery. A first gas diffusion impedance comprises a gas permeable, liquid impermeable wall of thermoplastic material between the wet active components of the battery and the paper strip. The paper strip constitutes a second diffusion impedance which is primarily effective to impede the flow of gaseous water out of the battery. The preferred mode of practice of the invention will best be understood in the light of the following detailed description, together with the accompanying drawings, of various illustrative embodiments of the invention.

In the drawings,

FIG. 1 is a schematic perspective sketch illustrating in somewhat condensed form the manufacture of laminated battery frames in accordance with one embodiment of the invention;

FIG. 2 is a fragmentary schematic elevational sketch, with parts omitted and parts broken away, showing a portion of the process of FIG. 1 on an enlarged scale as seen essentially along the lines 2—2 in FIG. 1;

FIG. 3 is a schematic elevational cross-sectional sketch showing a portion of the laminate formed in FIG. 1 as seen essentially along the lines 3—3 in FIG. 1 but on an enlarged scale;

FIG. 4 is a schematic elevational cross-sectional sketch, showing a portion of a frame made by the process of FIG. 1 as seen along the lines 4—4 in FIG. 1 but on an enlarged scale;

FIG. 5 is a schematic plan view, with parts broken away, showing a framed separator made in accordance with the process of FIG. 1;

FIG. 6 is a schematic perspective sketch of a completed battery incorporating a framed separator in accordance with FIG. 5 and shown primarily to establish the setting in which more detailed FIG. 7 is taken;

FIG. 7 is a fragmentary schematic elevational sketch, on an enlarged scale, with vertical dimensions exaggerated relative to horizontal dimensions, showing typical portions of the interior of the battery of FIG. 6 as seen along the lines 7—7 in FIG. 6;

FIG. 8 is a fragmentary schematic perspective sketch illustrating a modification of the process of the invention for making a vented frame and end terminal laminate in accordance with another embodiment of the invention; and FIG. 9 is a fragmentary schematic view of a portion of a battery corresponding generally to FIG. 7 but showing a modified vented frame construction.

Referring to FIGS. 1 and 2, one of the materials used in the manufacture of vented frames in accordance with the invention is a sheet 1 of thermoplastic material which may be taken from a suitable conventional supply reel 2. The sheet 1 may be of any suitable thermoplastic material that will soften and flow under heat and pressure, is chemically inert in the battery environment in which it is to be used, and is impervious to liquids, although it must be permeable to gases as are most thermoplastic sheet materials. The sheet 1 may be made of a single material, although if it is, it is preferable to incorporate a release sheet on one side that will later be removed following the manufacture of frames in the manner to be described. However, preferably, as illustrated in FIG. 2, the sheet 1 comprises an outer layer 3 and an inner layer 4, both of which are thermoplastic materials of the type just described, but one of which will soften and flow at temperatures substantially lower than the other under the same conditions of pressure and duration of heating. In particular, the layer 4 is preferably the lower temperature softening material and the sheet 3 is selected to be dimensionally stable at the temperatures and pressures under which the layer 4 will soften and flow. In accordance with an exemplary embodiment of the invention, the sheet 3 was made of vinyl film 3 mils in thickness and the layer 4 was applied thereto by an extrusion and calendaring as a layer 2 to 3 mils thickness.

Vinyl films that have been successfully employed include TENNECO VCR 1001, a copolymer of 80 parts of vinyl chloride and 20 parts of vinyl acetate, by weight based on the weight of copolymer, and polyvinyl chloride film. The vinyl films, or other materials of similar properties that will occur to the artisan, which may also be employed, typically melt and flow at temperatures between 450 and 550 degrees F. in the range of pressures usually employed.

The material selected for use as the layer 4 preferably softens and becomes adhesive in the range of 250° to 400° F. under ordinary processing conditions. One such that has been successfully employed and is presently preferred is Versalon 1140 polyamide hot melt adhesive, as made and sold by General Mills, Inc., of Minneapolis, Minn.

As it is apparent from FIG. 1 and as will be described in more detail below, the sheet 1 is laminated to a sheet 5 of thermoplastic material taken from a supply roll as suggested at 6. The sheet 5 may be of a single thermoplastic material of the same properties described above with respect to the sheet 1, but most preferably, as shown in FIG. 2, the sheet 5 comprises a laminate of two layers 7 and 8 of dissimilar thermoplastic materials. At least the side 8 confronting the layer 4 of the sheet 1 in the laminating process is preferably of a higher temperature flowing material than the layer 4, and for example may be identical with the layer 3 in the sheet 1. The side 7 is preferably a layer of lower melting material and may be identical with the layer 4 in the sheet 1. Thus, the sheet 5 may be made by the same process as the sheet 1 described above with the same thicknesses and materials.

As illustrated in FIG. 1, the sheet 1 passes from the supply roll 2 over a driven and heated roll 9 supplied with steam under pressure, for example, to heat the layer 4 to a softening temperature, for example in the range 300° to 350° F.

At least one narrow paper strip 10 is laminated between the sheets 1 and 5 toward the edges of the sheets. As is suggested in FIG. 1, the strip 10 may be supplied from a roll 11 journalled for rotation on a shaft 12 in a conventional manner. Depending on the venting requirements of the battery to be made, a second strip 13 of paper carried on a spool 14 may also be laminated between the sheets 1 and 5 towards the other edge of the sheets. The strips such as 10 and 13 may be of paper from 2 to 5 mils in thickness, and from 1/16 to ⅜ inches in width, depending on the venting requirements of the batteries in which they are to be installed, but in accordance with the presently preferred practice of the invention in a specific embodiment, they are of kraft paper 3 mils in thickness and approximately ⅛ inch in width.

As shown in FIGS. 1 and 2, the materials to be laminated are passed between a pair of nip rolls 15 and 16 where they are joined under pressure such that the softened layer 4 is adhered to the layer 8 of the sheet 5 and the material 4 flows around and seals three outer sides of the paper strips 10 and 14 as best seen in FIG. 3. Preferably, the roll 15 is heated and the roll 16 is not heated, or actively cooled, as with chilled water. The object of this procedure is to produce sufficient flow in the layer 4 of the sheet 1 for sealing and adhesion, but not to soften the layer 7 of the sheet 5. As a further aid to this goal, the surface of the roll 15 may be made of a material having a high heat transfer coefficient, such as stainless steel, whereas the surface of the roll 16 should be of a material that will not easily block to the layer 7 of the sheet 5, such as polytetrafluoroethylene or the like.

It may be desired to cool the laminate 18 formed from the sheets 1 and 5 and the paper strips 10 and 13 as just described, although this step has not been illustrated in the drawings. It may be carried out by simply allowing a long enough run of the laminate 18 before the next step so that air cooling will take place, or by passing the laminate 18 around a chill roll.

The next step in the process of making frames in accordance with the invention is to cut windows through the laminate 18 between the embedded paper strips 10 and 13. For this purpose, a fixed cutting die 19 and a moveable cutting die 20 may be employed, cutting out pieces 21 of the laminate as suggested in FIG. 1 and leaving rectangular apertures 22 that will later receive cell components in the the manufacture of a battery.

As a next step in the process, although not essential in the practice of the invention in its broader aspects, cellophane separators 23 may be added, as from a stack 24, by pick and place techniques as suggested in FIG. 1, and fixed over the apertures 22 and extending beyond the borders thereof. The separators 23 may be affixed by application of heat and pressure sufficient to adhere them to the soft surface 7 of the laminate 18. At a selected stage in the process thereafter, the laminate 18 may be cut, as where suggested by the dotted lines 25 in FIG. 1, into individual battery frames. FIG. 1 illustrates the option which has been adopted in practice, which involves onto a suitable takeup roll 26 rolling the framed separators before cutting.

FIG. 5 shows rather schematically a frame 27 made as described above in which paper strips 10a and 14a are embedded with their ends exposed to the atmosphere following the cutting operation described above. One such frame 27 has been found adequate for the venting of a four cell battery. Depending on the amounts of electrochemically active material employed, one strips 10a or two strips 10a and 14a may be included in each such frame.

The vented frames may be incorporated in a battery in the manner described in application Ser. No. 761,653, abandoned, cited above. Preferably, they are included in a battery constructed in other respects the same as described in copending U.S. patent application Ser. No. 852,919, filed Nov. 18, 1977, abandoned, for Laminar Batteries and Methods of Making the Same, filed concurrently with this application by Michael E. Gordon and Frank Steiger and assigned to the assignee of this application abandoned and replaced by continuation application Ser. No. 951,122, filed Oct. 13, 1978, now U.S. Pat. No. 4,177,330. External aspects of such a battery are illustrated at 30 in FIG. 6, where the battery is seen as having a raised central region 31 and a relatively depressed marginal portion 32 effected during the sealing operations, for example, in the manner described in U.S. Pat. No. 4,019,251, issued on April 26, 1977 to Thomas P. McCole for Flat Battery and Method of Manufacture, and assigned to the assignee of this application.

The electrochemical system used in the battery 30 may be of any known variety which requires the selective exhausting of hydrogen, while limiting the loss of gaseous water and inhibiting the ingress of oxygen and nitrogen. The vented frame of the invention is especially well suited for use with a Leclanche system, and will be particularly described with reference to a Leclanche cell of the kind described in detail in U.S. patent application Ser. No. 761,651, filed on Jan. 24, 1977 now U.S. Pat. No. 4,119,770 by Edwin H. Land for Electrical Cells and Batteries and assigned to the assignee of this application, which is incorporated herein by reference.

Briefly, such a battery may comprise four cells chemically isolated and electrically connected in series by conductive plastic intercell connectors 33 as shown in FIG. 7. The four cells of the battery each include a slurry cathode 34 which may comprise a mixture of manganese dioxide and carbon black dispersed in an electrolyte comprising an aqueous solution of ammonium chloride and zinc chloride. Anodes 35 may be provided in the form of zinc patches preformed on the intercell connectors 33 and on a conductive plastic current collector 36 at the anode terminal. The current collector 36 may be of any conventional conductive plastic material preferably about 2 mils in thickness, and prelaminated to an anode terminal 37 which may be a 2 mil sheet of aluminum or tin plated steel. The cathodes 34 communicate with the anodes 35 through intermediate layers of gel electrolyte 38. The gel electrolyte may comprise an aqueous solution of zinc chloride, ammonium chloride and initially some mercuric chloride as an amalgamating agent, together with a thickener such as hydroxyethylcellulose. Four cellophane separators are provided, including the separator 23 initially prelaminated to the frame 27 as shown in FIGS. 4 and 5, and three additional separators 40 that may be initially prelaminated in the same way to three additional frames 41. Frames 41 may be made of the same materials as the frame 27, but comprise a two part laminate without a vent. The frames 41 are preferably formed as described in more detail in U.S. application Ser. No. 825,919, abandoned, cited above. In particular, they comprise a relatively thick layer 42, for example, 8 mils in thickness, of the same material as the layers 3 and 4 in the frame 27; e.g., vinyl sheeting or the like. Each of the relatively thick layers 42 is coated with or otherwise laminated to a layer 43 which may be of the same relatively low melting adhesive material as the layers 4 and 7 in the frame 27.

The battery 30 is preferably assembled and sealed in the manner described in detail in the above cited application Ser. No. 852,919, abandoned, which application is incorporated herein by reference. Briefly, a cathode terminal assembly comprising a conductive plastic current collector sheet 44 prelaminated to a steel or aluminum terminal sheet 45 has extruded onto it the first cathode 34. The frame 27 with its separator 23 is next put into place and sealed to the current collector 44 under pressure, preferably with heat applied through the metal terminal sheet 45 so that the layer 8 can be softened and adhered to the conductive plastic without appreciably softening the intermediate layer 4. This approach is preferred although not critical because it has been found that with batteries of four cells, the vented frame 27 can be installed as any of the frames in the battery and the completed assembly sealed with the application of heat from either side or both sides. However, the process first described is better from a heat transfer standpoint, as well as from the standpoint of preventing unwanted flow of the heat softened thermoplastic materials, and should be considered where batteries of many cells are desired.

The first layer 38 of gel electrolyte is next applied and then the intercell connector 33 with its anode 35 is put in place and sealed to the frame 27. Assembly is continued in this fashion until the battery is complete.

The area in which the frames and conductive plastic intercell connectors are fused and sealed together is indicated in FIG. 7, and is generally outside the dotted line 46 as seen in FIG. 5. It is important that the vent strip, as at 10 in FIG. 7, is located well within this seal area so that the surrounding regions of the frame elements 3, 4, 8 and 7 are readily accessible to gas flowing from the interior of the battery outwardly. The vent strip 10 is not exposed to liquid as it is buried in the thermoplastic structure of the frame 27, being surrounded on three sides by the low melting material 4 and on the fourth side by the vinyl sheet 3, which is also sealed in liquid tight fashion to the layer 4. This surrounding thermoplastic structure is, however, quite pervious to hydrogen, to water in the gaseous phase, and to a lesser degree to oxygen and nitrogen.

The paper vent strip has been found to constitute a significant impedance to the flow of gaseous water, as described in the above cited application Ser. No. 761,653, abandoned. For use in the specific cell constructions described in U.S. application Ser. No. 761,651 cited above, using relatively heavy cathodes 34 approximately 20 mils in thickness and weighing about 3½ grams apiece, both the vent strips 10 and 14 are preferably included in the vented frame 27. For batteries using the same number of cells and comparable areas but lighter cathodes, such as 1½ to 2 grams cathodes, a single vent strip has been found satisfactory.

An alternative method of making a vented frame is illustrated in FIG. 9. In this method, a strip of frame material 50 is made by die-cutting a series of apertures such as 51 in an elongated sheet of suitable thermoplastic sheet, such as the vinyl sheet described above. One or more paper vent strips such as 52 is then laminated between the frame strip 50 and a conductive thermoplastic current collector sheet 53 forming a part of an end terminal laminate and prelaminated to a metal end terminal sheet 54. The finished laminate is then cut into end terminal and vented frame subassemblies and used to make batteries of the kind described above, except that the paper strip 52 is now embedded between the vinyl frame 50 and the conductive plastic current collector 53 in the manner shown in FIG. 10. (FIG. 10 corresponds to that portion of the battery shown in FIG. 7 at the right side of the lowermost cell.) In this embodiment, the separator 23a is not necessarily bonded to either the current collector or the frame, but may simply be placed over the cathode before the frame 30 is added. The battery can otherwise be completed in the manner described above and in the form shown in FIGS. 6 and 7.

While the invention has been described with respect to the details of various illustrative and preferred embodiments, many changes and variations will occur to those skilled in the art upon reading this description and such can obviously be made without departing from the scope of the invention.

Having thus described the invention, what is claimed is:

1. In the method of making vented battery frames, the steps of embedding at least one elongated strip, consisting essentially of paper, between confronting sheets of thermoplastic sheet material by adhering the confronting thermoplastic sheets together to thereby enclose the strip in a thermoplastic matrix, and cutting windows through the adhering sheets alongside and spaced from said strip to form a ladder of vented battery frames.

2. The method of making vented battery frames, comprising the steps of embedding at least one narrow elongated strip consisting essentially of paper between confronting sheets of thermoplastic sheet material by adhering the confronting thermoplastic sheets together to thereby enclose said strip in a thermoplastic matrix, cutting windows through the adhering sheets alongside and spaced from said strip to form a vented ladder of battery frames, and cutting said adhering sheets and the strip enclosed thereby between said windows to form individual vented battery frames with ends of pieces of said strip in each frame exposed.

3. The method of making vented battery frame stock, comprising the steps of feeding a pair of spaced parallel elongated strips consisting essentially of paper between confronting sheets of dissimilar thermoplastic sheet materials, both of said materials being liquid-impermeable and gas-permeable, through a pair of heated nip rolls to adhere the confronting thermoplastic sheets together and thereby enclose the strips, a first of said materials softening and flowing under lower temperatures and pressures than the second, whereby said paper strips are enclosed on three sides by said first material and on one side by said second material and are surrounded on four sides by a gas-permeable, liquid-impermeable barrier, and cutting windows through the adhering sheets between the strips to form a ladder of vented battery frames.

4. The method of making vented battery frame stock, comprising the steps of feeding a pair of spaced parallel elongated strips consisting essentially of paper between confronting sheets of dissimilar thermoplastic sheet materials through a pair of heated nip rolls to adhere the confronting thermoplastic sheets together and thereby embed the strips in a thermoplastic matrix.

5. The method of making vented battery frames comprising the steps of feeding a pair of spaced parallel elongated strips consisting essentially of paper between confronting sheets of thermoplastic sheet material through a pair of heated nip rolls to adhere the confronting thermoplastic sheets together and thereby enclose the strips, cutting windows through the adhering sheets between the strips to form a vented ladder of battery frames, adhering a cellophane separator over each of said windows, and cutting said adhering sheets and the strips enclosed thereby between said separators to form vented frame and separator subassemblies.

6. In the method of making vented battery frame stock from two narrow elongated strips of paper and first and second elongated sheets of thermoplastic laminate of first and second gas-permeable, liquid-impermeable thermoplastic materials, said first material softening and flowing at lower temperatures than said second material, the steps of feeding said strips in spaced parallel relationship between said sheets between a pair of nip rolls with said first material on said first sheet confronting said second material on said second sheet while heating only the nip roll in contact with said first sheet to cause said first material on said first sheet to soften and flow and adhere to said second sheet and thereby embed said strips in a gas-permeable, liquid-impermeable matrix with said strips being surrounded on three sides by said first material and on a fourth side by said second material.

7. The method of claim 6, further comprising the step of cooling the nip roll contacting said second sheet.

8. The method of claim 6, further comprising the step of cutting windows through said sheets between said strips and spaced therefrom to form a ladder of vented frame material.

9. The method of making vented frame and end terminal assemblies for laminar batteries from a thin metal sheet on one surface of which there is a thin layer of conductive plastic, a narrow elongated strip of paper and a ladder of battery frame stock comprising a thin elongated sheet of thermoplastic gas-permeable, liquid-impermeable material formed with a series of spaced windows to receive battery components, comprising the steps of laminating said paper strip between said ladder and said conductive plastic under heat and pressure with said paper strip between said windows and one edge of said frame stock and said laminate to embed said strip in a liquid-impermeable thermoplastic matrix permeable by gases diffusing through said frame stock, and cutting the laminate so formed between at least selected ones of said windows to make vented frame and end terminal assemblies.

10. A vented laminar battery having cells sealed by means comprising thin flat thermoplastic frames formed with central apertures to receive cell components, at least one of said frames comprising a laminate of first and second different thermoplastic gas-permeable, liquid-impermeable materials and at least one narrow elongated strip of paper embedded between said first and second materials with at least one end exposed, said strip being surrounded on three sides with said first material and on one side with said second material.

11. A vented frame for laminar batteries, comprising a thin, flat laminate of first and second different gas-permeable, liquid impermeable thermoplastic materials formed with a central aperture to receive cell components, and a narrow elongated strip of paper embedded between said first and second materials and extending along one side thereof to exposed ends, said strip being surrounded on three contiguous sides with said first material and on a fourth contiguous side with said second material.

12. In the method of making vented laminar batteries, the steps of embedding at least one narrow elongated paper strip in and between confronting liquid impermeable strata each comprising thermoplastic material, at least one of said strata being gas permeable and formed as a frame having a central opening to receive battery components, said strip being fed between said strata within the borders thereof but outside of said central opening.

13. The method of making vented frames for laminar batteries, comprising the steps of laminating a narrow elongated strip of paper between and along one side of thin confronting sheets of first and second different gas-permeable, liquid-impermeable thermoplastic materials to embed said strip between said first and second materials, so that said strip is surrounded on three contiguous sides with said first material and on a fourth contiguous side with said second material, forming central apertures to receive cell components in said sheets, said apertures being spaced from each other and from said strip, and severing said sheets and the strip embedded therein between said apertures to form individual vented frames each having a portion of said strip embedded therein with ends of said portion exposed.

* * * * *